United States Patent [19]

Chen-Liang

[11] Patent Number: 4,690,534
[45] Date of Patent: Sep. 1, 1987

[54] SUPERMINIATURE CAMERA
[75] Inventor: Cheng Chen-Liang, Hsintien, Taiwan
[73] Assignee: Chen Liang Co., Ltd., Hsintien, Taiwan
[21] Appl. No.: 914,017
[22] Filed: Oct. 1, 1986
[51] Int. Cl.$^4$ .................. G03B 1/10; G03B 13/06; G03B 17/04
[52] U.S. Cl. .................. 354/187; 354/212; 354/219; 354/288
[58] Field of Search .................. 354/187, 202 R, 219, 354/288, 212

[56] References Cited
U.S. PATENT DOCUMENTS

| | | | |
|---|---|---|---|
| 2,143,385 | 1/1939 | Platt | 354/187 |
| 2,448,920 | 9/1948 | Silberstein | 354/219 |
| 2,667,111 | 1/1954 | Fried | 354/212 |
| 3,603,232 | 9/1971 | Jones | 354/212 |
| 3,631,783 | 1/1972 | Jones | 354/288 |
| 3,648,582 | 3/1972 | Nerwin | 354/219 |
| 3,728,949 | 4/1973 | Edwards | 354/212 |
| 3,777,639 | 12/1973 | Lange | 354/288 |
| 3,782,259 | 1/1974 | Noble | 354/212 |
| 3,893,139 | 1/1975 | Winkler | 354/187 |

Primary Examiner—A. A. Mathews
Attorney, Agent, or Firm—Limbach, Limbach & Sutton

[57] ABSTRACT

A superminiature camera, of the type using a conventional 110 film cassette with a first gear for film advance, has an extensible camera body. The camera body includes a rotary side wall, normally releasably fastened to the upper wall and when in use rotatable about its lower side to a horizontal position, including a second gear on the inner surface of the rotary side wall, and a rotary knob integrated with the second gear; an upper wall; a lower wall; an extensible rear wall, slidably engaged with the upper and lower walls, extensible firstly outwardly for entrance into the camera body of the film cassette, subsequently contractible inwardly to clamp the film container and simultaneously to urge the first and second gears to mesh with each other for film advancing; and a viewfinder with a contractible eyepiece and a contractible objective piece. When the superminiature camera is in an idle condition, as the viewfinder and the extensible rear wall are contracted, and the rotary side wall is fastened to the upper wall, the superminiature camera is extremely small in volume.

4 Claims, 5 Drawing Figures

SUPERMINIATURE CAMERA

BACKGROUND OF THE INVENTION

The invention relates to a miniature camera, paritcularly to a superminiature camera with an extensible camera body which uses a conventional 110 film cassette.

A conventional 110 film cassette 1, as shown in FIG. 1, includes a film roll-out cylinder 11 with a spool 12 in the roll-out cylinder 11 and a gear 13 on an end portion of the spool 12 extending externally of said roll-out cylinder 11, a film roll-in cylinder 14, and a middle hollow section 15 connecting the two cylinders 11 and 14. A miniature camera using the 110 film cassette 1 has been developed. It is convenient to store and carry, compared with common camera, but the 110 film cassette 1 is relatively large so that the miniature camera is still relatively large due to the arrangement of a chamber for receiving the 110 film cassette 1. The decrease in size of the miniature camera is limited, compared with a common camera, and further miniaurization is therefore desirable.

SUMMARY OF THE INVENTION

It is therefore an object of the invention to provide a superminiature camera using a conventional 110 film cassette, having an extensible camera body, which is of greatly miniauraturized size in its collapsed idle condition and which is therefore more convenient to store and carry, compared with the conventional miniature camera described.

According to the invention, a superminiature camera, using a conventional film cassette which includes a roll-out cylinder, a roll-in cylinder, a middle hollow section connecting the roll-out cylinder and roll-in cylinders, a spool in the roll-out cylinder, and a first gear on an end portion of the spool extending externally of the roll-out cylinder has an extensible camera body, including a front wall with a lens thereon; a first side wall; a rotary second side wall, opposing the first side wall, pivoted to the lower wall at a lower side of the rotary second side wall and rotatable to a horizontal position in which the camera is usable, the rotary side wall including a second gear on an inner surface of the rotary second side wall capable of engaging with the first gear of the spool, and a rotary knob integrated with the second gear; a releasable fastening device for fastening the rotary second side wall to the upper wall when the camera is to be collapsed to idle position; a rear wall, including an upper slide portion and a lower slide portion thereon, the slide portions projecting from the rear wall toward the front wall; an upper wall with a first guide device thereon for guiding the sliding movement of the upper slide portion of the rear wall and the upper wall with respect to each other; a lower wall with a second guide device thereon for guiding the sliding movement of the lower slide portion of the rear wall and the lower wall with respec to each other; a viewfinder, including an eyepiece mounted on the rear wall and contractible longitudinally of the rear wall to a level not higher than that of the upper wall in an idle position, and an objective piece mounted on the front wall and contractible longitudinally of the front wall to a level not higher than that of said upper wall in an idle position; and a locating device for locating the two slide portions of the rear wall at a front, intermediate and rear positions of the two guide devices, the rear wall being nearest to said two side walls when the slide portions are located at the front position and farthest to the side walls when the slide portions are located at the rear position.

When the slide portions are located at the intermediate position, the width of the space between the rear wall and the side is larger slightly than the thickness of the middle hollow section of the film cassette so that the middle hollow section is capable of being clamped tightly between the rear wall and the saide walls.

Furthermore, when the slide portions are located at the rear position, the space formed between the rear wall and the side walls is larger and wider than either of the cylinders of the film cassette so as to permit entrance of the film cassette.

Accordingly, when the slide portions are extended to the rear position, the space formed between the rear wall and the side walls is sufficiently large to permit entrance of the cylinders of the film container. Subsequently, when the middle hollow section of the film container is located perpendicular to the rotary side wall as extended to the horizontal position and the slide portions are contracted to the intermediate position, the middle hollow section of the film container is clamped tightly between the rear wall and the side walls for film to pass therethrough and record a picture. At the same time, the first and second gears are meshed with each other for driving the spool of the film cassette to rotate for film advancing.

DETAILED DESCRIPTION OF THE PREFERRED EMBODIMENT

Figure 1:
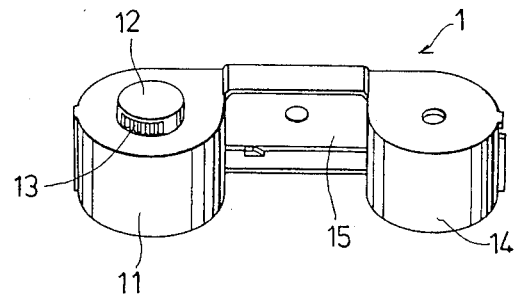
FIG. 1 is a perspective view showing a conventional 110 film cassette.
Figure 2:
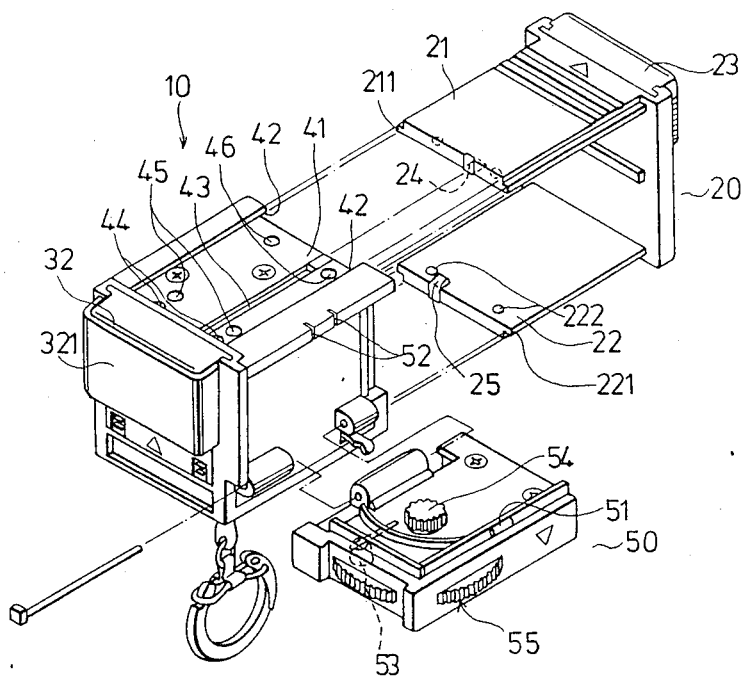
FIG. 2 is an exploded view showing a superminiature camera which can use the film cassette of FIG. 1, according to the invention.

Referring to FIG. 2, a superminiature camera have an extensible camera body 10. The extensible camera body 10 includes a stationary upper wall, a stationary lower wall, a stationary first side wall, a rotary second side wall 50, a stationary front wall, and an extensible rear wall 20 for retaining a conventional 110 film cassette having a spool 12 with a first gear 13 when it is extended at a predetermined position described hereinafter.

Figure 3:
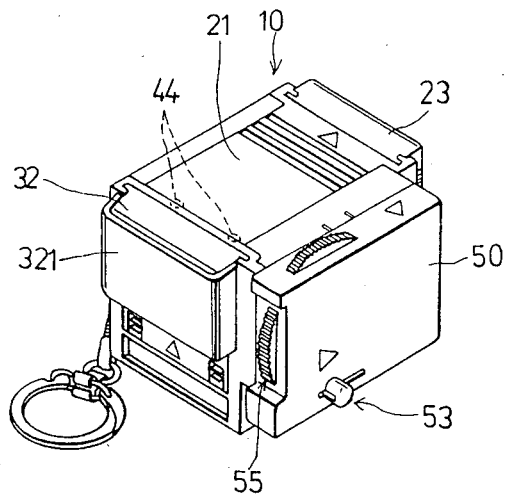
FIG. 3 is a perspective view showing the superminiature camera of FIG. 2 in an idle condition.
Figure 4:
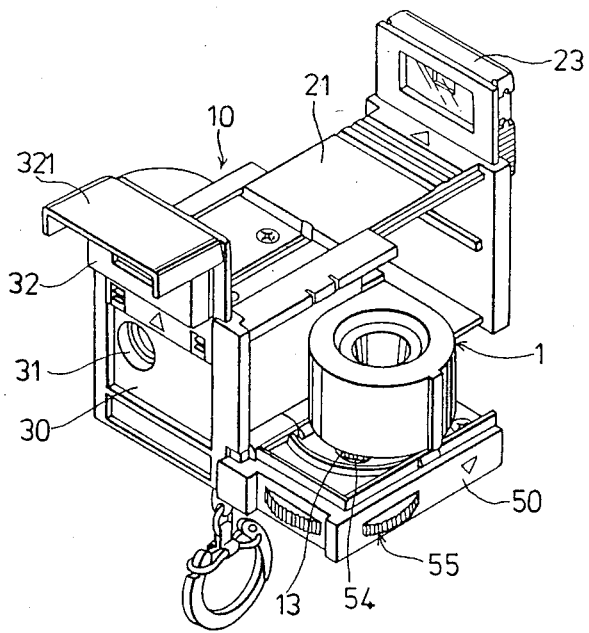
FIG. 4 is a schematic view showing how the film cassette of FIG. 1 operates in cooperation with the superminiature camera of FIG. 2.
Figure 5:
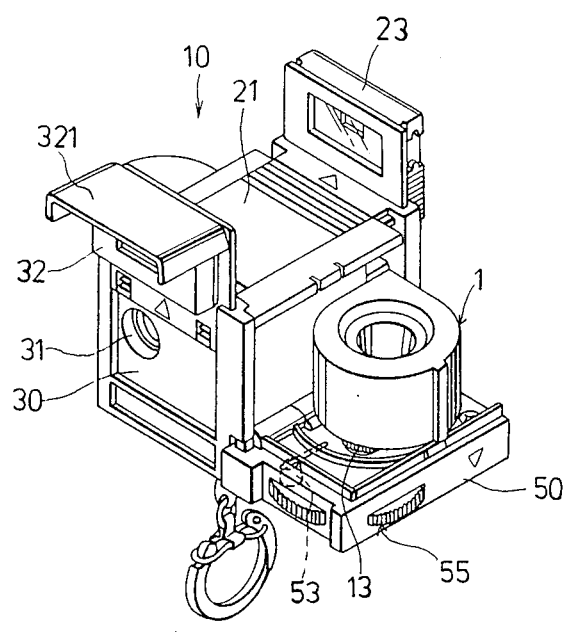
FIG. 5 is a perspective view showing the superminiature camera ofFIG. 2 in an usable condition.

The rear wall 20 includes an upper slide plate 21, horizontally projecting from an upper portion of the rear wall 20 toward the front wall, having a lower flange 211, a pair of spring biased downwardly balls (not shown) on the bottom surface of the upper slide plate 21, and a downward bump 24 projecting from the bottom surface of the upper slide plate 21; a lower slide plate 22, horizontally projecting from a lower portion of the rear wall 20 toward the front wall, including an upper flange 221, a pair of spring upwardly biased balls 222 on the upper surface of the lower slide plate 22, and an upward bump 25 projecting from the upper surface of the lower slide plate 22; and a slide eyepiece 23 of a viewfinder. The slide eyepiece 23 is contractible to a stored position at a same level as the upper wall (as shown in FIGS. 2 and 3) in an idle position, and is extensible to a level above that of the upper wall along a first recess (not shown) with two first guide ways provided on the rear surface of the said rear wall 20 (as shown in FIGS. 4 and 5) in an usuable position.

The front wall 30 includes a lens 31 and a slide objective piece 32 of the viewfinder contractible in a manner similar to that of the slide eyepiece 23 along a second recess with two second guide ways provided on the front surface of the front wall. The objective piece 32 includes a foldable protective plate 321 at the top portion thereof. Certainly, it is understood in the art that in the viewfinder the objective piece 32 must oppose the eyepiece 23.

On the upper surface of the upper wall is a third recess 41. The third recess 41 includes two third guide ways 42 on two side thereof; a guide groove 43 extending lengthwise of the recess 41, capable of engaging with the downward bump 24 of the rear wall 20 for positively guiding the sliding movement of the upper slide plate 21 on the upper wall; and three pairs of aligned locating cavities, i.e. front cavities 44, intermediate cavities 45 and rear cavities 46, capable of respectively engaging with the spring biased downwardly balls of the upper slide plate 21 for locating the upper slide plate 21 on the upper wall.

The lower wall is similar to the upper wall in construction with reference to the lower and upper slide plates, accordingly, more detailed description of its construction is omitted and in use only the opeation between the upper wall and the upper slide plate is described hereinafter.

The rotary side wall 50 is hinged to the lower wall at the lower side of the rotary side wall 50 and rotatable to a horizontal extended position, as shown in FIGS. 4 and 5. Further, it is releasably fastened to the upper wall by a tongue and groove joint. The tongue and groove joint is achieved by a tongue 51 provided on the upper side of said rotary side wall 50 and a groove 52 provided on the side of the upper wall opposing the rotary side wall 50. Additionally, the rotary side wall 50 includes a shutter 53 thereon, a second gear 54 on a suitable position of the inner surface of the rotary side wall 50, and a rotary knob 55 integrated with the second gear 54. The shutter 53 is well known in the art, its description is therefore omitted.

Referring to FIG. 3, when the superminiature camera is in an idle condition, the downward bumps 24 of the upper slide plate 21 engages with the pair of front cavities 44. At the same time, the rotary side wall 50 is fastened to the upper wall by the tongue and groove joint, and the eyepiece 23 and objective piece 32 of the viewfinder are contracted to its stored position, with the protective plate 321 of the objective piece 32 folded longitudinally of the objective piece 32. Accordingly, in this condition, the superminiature camera is smallest in volume so that it is convenient to be stored and carried.

Referring to FIG. 4, when it is desired to use the superminiature camera, firstly, the eyepiece 23 and the objective piece 32 of the viewfinder are pulled to the extended position, and the protective plate 321 of the objective piece 32 is unfolded. Secondly, the rotary side wall 50 is rotated to the horizontal position, then the rear wall 20 is pulled outwardly until the spring biased downwardly balls engage with the pair of rear cavities 46. In that condition, the space formed betwen the rear wall 50 and the side walls is sufficiently large to permit entrance of the cylinders 11 and 14 of the film cassette 1. The middle hollow section 15 of the film cassette 1 then rests perpendicular to the extended rotary side wall 50. Finally, the rear wall 20 is pushed toward the front wall until the spring biased downwardly balls engage with the pair of intermediate cavities 45 and the laminated bridge 15 of the film cassette 1 is clamped tightly between the rear wall 50 and the side walls, as shwon in FIG. 5. Accordingly, the first gear 13 of the film cassette 1 and the sencod gear 54 are meshed with each other for driving the rotating shaft 12 of the film cassette 1 to rotate for film advancing. After the cassette 1 is thus put into position, the superminiature camera can be used.

It is apparent from the preferred embodiment shown and described that the total volume of the superminiature camera in an idle condition equals approximately about the volume of the chamber for receiving the conventional 110 film cassette in a prior miniature camera.

It is an additional advantage in the embodiment that the lens 31 of the superminiature camera is protected by the objective piece 32 of the viewfinder in a stored condition.

With the invention thus explained, it is apparent that various modifications and variations can be made without departing from the scope of the invention. It is therefore intended that the invention be limited as indicated in the appended claims.

What is claimed is:

1. A superminiature camera for use with a 110 film cassette, said film cassette including a roll-out cylinder, a spool mounted in said roll-out cylinder, a first gear provided on an end portion of said spool extending externally of said roll-out cylinder, a roll-in cylinder, and a middle hollow section connecting said two cylinders and having an exposing portion, said superminiature camera having an extensible camera body, said extensible camera body comprising:

a front wall with a lens thereon;

a first side wall;

a rotary second side wall, opposing said first side wall, pivoted to said lower wall at a lower side of said rotary side wall and rotatable to a horizontal position when it is to used, a second gear on an inner surface of said rotary second side wall capable of engaging with said first gear of said film cassette, and a rotary knob integrated with said second gear;

a releasable fastening device for fastening said rotary second side wall to said upper wall when said superminiature camera is in an idle condition;

a rear wall, including an upper slide portion and a lower slide portin thereon, said slide portions projecting from said rear wall toward said front wall;

an upper wall including a first guide device thereon for guiding the sliding movement of said upper slide portion of said rear wall with respect ot said upper wall so as to permit the horizontal movement of said rear wall;

a lower wall including a second guide device thereon for guiding the sliding movement of said lower slide portion of said rear wall with respect to said lower wall so as to permit the horizontal movement of said rea wall;

a viewfinder, including an eyepiece mounted on a front side of said camera body, and an objective piece opposing said eyepiece on a rear side of said camera body; and a locating device for locating said two slide portions of said rear wall at a front, intermediate and rear positions of said two guide devices, said rear wall being nearest to said two side walls when said slide portions are located at said front position, the width of the space between said rear wall and said side walls being larger slightly than the thickness of said middle hollow section of said film cassette when said slide portions are located at said intermediate position, the space between said rear wall and said side walls being higher and wider than said cylinders of said film cassette;

whereby, said film cassette can be inserted into the space formed when said slide portions are in the rear position, can be snapped into usable condition when said slide portions are in the intermediate position, wherein said second is disposed in such a manner that, when said slide portions are in the intermediate position, said second gear will mesh with said first gear of said film spool so as to drive said first gear.

2. A superminiature camera as claimed in claim 1, wherein said eyepiece of said viewfinder is mounted on said rear wall and contractible longitudinally of said rear wall to a level not higher than that of said upper wall, and wherein said objective piece of said viewfinder is mounted on said front wall and contractible longitudinally of said front wall to a level not higher than that of said upper wall, so as to decrease the volume of said camera which is in an idle condition.

3. A superminiature camera as claimed in claim 2, wherein said objective piece includes a protective plate disposed on a top portion thereof and foldable downwardly to longituidnally of said front wall.

4. A superminiature camera as claimed in clam 1, wherein each of said two slide portions of said rear wall is a slide plate, and wherein each of said guide devices of said upper and lower walls is a recess with two guide ways provided on two sides of said recess, so that said slide plates are slidable along said guide ways.

* * * * *